(12) United States Patent
Taherzadeh Boroujeni et al.

(10) Patent No.: US 11,778,545 B2
(45) Date of Patent: Oct. 3, 2023

(54) COVERAGE ENHANCEMENT FOR INITIAL ACCESS WITH FEEDBACK VIA PRACH SEQUENCE

(71) Applicant: QUALCOMM Incorporated, San Diego, CA (US)

(72) Inventors: Mahmoud Taherzadeh Boroujeni, San Diego, CA (US); Tao Luo, San Diego, CA (US); Peter Gaal, San Diego, CA (US); Xiaoxia Zhang, San Diego, CA (US); Jing Sun, San Diego, CA (US); Wooseok Nam, San Diego, CA (US); Iyab Issam Sakhnini, San Diego, CA (US); Jelena Damnjanovic, Del Mar, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 17/446,090

(22) Filed: Aug. 26, 2021

(65) Prior Publication Data
US 2022/0070764 A1    Mar. 3, 2022

Related U.S. Application Data

(60) Provisional application No. 63/071,769, filed on Aug. 28, 2020, provisional application No. 63/071,834, (Continued)

(51) Int. Cl.
*H04W 48/16* (2009.01)
*H04W 72/044* (2023.01)
*H04W 72/02* (2009.01)

(52) U.S. Cl.
CPC ........... *H04W 48/16* (2013.01); *H04W 72/02* (2013.01); *H04W 72/046* (2013.01)

(58) Field of Classification Search
CPC ... H04W 48/16; H04W 72/02; H04W 72/046; H04W 48/12; H04W 72/042; H04W 72/23; H04B 7/0639; H04B 7/0695
See application file for complete search history.

(56) References Cited

U.S. PATENT DOCUMENTS 11,606,822 B2 * 3/2023 Shin .................. H04J 13/16
2018/0262313 A1 * 9/2018 Nam .................. H04L 5/0044
(Continued)

FOREIGN PATENT DOCUMENTS

EP          3462633 A1 * 4/2019 ........... H04B 7/0408
WO    WO-2018045092 A1 * 3/2018

*Primary Examiner* — Walli Z Butt
(74) *Attorney, Agent, or Firm* — The Marbury Law Group

(57) ABSTRACT

In embodiments of systems and methods for managing communication between a wireless device and a base station, a base station may transmit Remaining Minimum System Information (RMSI) Downlink Control Information (DCI) indicating time and frequency resources for RMSI. A wireless device may receive a Channel State Indicator-Reference Signal (CSI-RS) based on the time and frequency resources for RMSI and may select a sub-beam of a beam associated with a synchronization signal block (SSB). The wireless device may send to the base station an indication of the selected sub-beam associated with the SSB in a Physical Random Access Channel (PRACH) message. The base station and the wireless device each may then perform an initial access procedure using the selected sub-beam to enable the wireless device to establish a communication link with the base station.

26 Claims, 12 Drawing Sheets

Related U.S. Application Data filed on Aug. 28, 2020, provisional application No. 63/071,532, filed on Aug. 28, 2020, provisional application No. 63/071,460, filed on Aug. 28, 2020.

(56) References Cited

U.S. PATENT DOCUMENTS

| | | | |
|---|---|---|---|
| 2019/0305837 A1* | 10/2019 | Onggosanusi | H04L 5/0057 |
| 2020/0228185 A1* | 7/2020 | Tao | H04B 7/0695 |
| 2021/0143879 A1* | 5/2021 | Ji | H04B 17/327 |
| 2022/0124835 A1* | 4/2022 | Shin | H04L 27/2621 |

* cited by examiner

COVERAGE ENHANCEMENT FOR INITIAL ACCESS WITH FEEDBACK VIA PRACH SEQUENCE

RELATED APPLICATIONS

This application claims the benefit of priority to U.S. Provisional Patent Application No. 63/071,460, entitled "Coverage Enhancement For Initial Access With Feedback Via PRACH Sequence", filed Aug. 28, 2020, U.S. Provisional Patent Application No. 63/071,834 entitled "Coverage Enhancement For Random-Access Channel Messages Using Beam Refinement And Enhanced Channel State Information", filed Aug. 28, 2020, U.S. Provisional Patent Application No. 63/071,769 entitled "Coverage Enhancement For Initial Access With Feedback Appended To PRACH", filed Aug. 28, 2020, and U.S. Provisional Patent Application No. 63/071,532 entitled "Coverage Enhancement For Initial Access With Reference Signal And Feedback Scheduled By RMSI", filed Aug. 28, 2020, the entire contents of which are hereby incorporated by reference for all purposes.

BACKGROUND

In Long Term Evolution (LTE) Fifth Generation (5G) New Radio (NR) and other communication technologies, wireless devices must perform an initial access procedure to establish communication with a communication network (e.g., via a base station or other suitable access point). Some communication systems utilize millimeter wave (mmWave) frequency bands to provide high bandwidth communication links. However, mmWave frequency bands are susceptible to free-space pathloss and atmospheric absorption. Further, broadcast transmissions from a base station are more severely affected by such signal degradation. One example of such broadcast transmissions includes system information transmitted by a base station for use by a wireless device to perform initial access procedures.

SUMMARY

Various aspects include systems and methods performed by base stations for enhancing coverage for initial access. Some aspects may include transmitting Remaining Minimum System Information (RMSI) Downlink Control Information (DCI) indicating that a Channel State Indicator-Reference Signal (CSI-RS) will be transmitted, receiving from a wireless device an indication of a selected sub-beam of a beam associated with a synchronization signal block (SSB) in a Physical Random Access Channel (PRACH) message, and performing an initial access procedure with the wireless device using the selected sub-beam indicated in the PRACH message.

In some aspects, the RMSI DCI may include time and frequency resources for an RMSI. In such aspects, the time and frequency resources for the RMSI may indicate time and frequency resources for the CSI-RS. Such aspects further may include transmitting the CSI-RS according to the time and frequency resources for the CSI-RS.

In some aspects, the RMSI DCI may indicate a number of sub-beams of the SSB. In some aspects, the received PRACH message may include a preamble sequence that indicates the selected sub-beam associated with the SSB. In some aspects, the received PRACH message may include a preamble sequence that corresponds to an index of the selected sub-beam associated with the SSB. In some aspects, the received PRACH message may include a preamble sequence from among a subset of preamble sequences. In such aspects, the subset of preamble sequences may correspond to an index of the selected sub-beam associated with the SSB. Some aspects may include determining a mapping of sub-beams associated with the SSB and preamble sequences, and identifying the selected sub-beam indicated by a preamble sequence in the PRACH message according to the mapping.

Further aspects include a base station computing device having a processor configured to perform one or more operations of any of the methods summarized above. Further aspects include a non-transitory processor-readable storage medium having stored thereon processor-executable instructions configured to cause a processor of a base station computing device to perform operations of any of the methods summarized above.

Various aspects include systems and methods performed by wireless devices for enhancing coverage for initial access. Some aspects may include receiving from a base station RMSI DCI, determining time and frequency resources for a CSI-RS based on the RMSI DCI, receiving the CSI-RS using the determined time and frequency resources, selecting a sub-beam of a beam associated with a synchronization signal block (SSB) based on the CSI-RS, and sending to the base station an indication of the selected sub-beam associated with the SSB in a PRACH message. In some aspects, selecting a sub-beam of a beam associated with a synchronization signal block (SSB) based on the CSI-RS may include selecting a sub-beam with highest received power on associated CSI-RS resources.

In some aspects, determining time and frequency resources for the CSI-RS based on the RMSI DCI may include determining time and frequency resources for an RMSI based on the RMSI DCI, and determining time and frequency resources for the CSI-RS based on the time and frequency resources for the RMSI. In some aspects, determining time and frequency resources for a CSI-RS based on a signal from a base station may include determining an additional parameter in the RMSI DCI, and determining time and frequency resources for the CSI-RS based on the time and frequency resources for the RMSI may include determining time and frequency resources for the CSI-RS based on the additional parameter.

In some aspects, the RMSI DCI may indicate a number of sub-beams of the SSB. In some aspects, the PRACH message may include a preamble sequence that corresponds to an index of the selected sub-beam associated with the SSB. In some aspects, the PRACH message may include a preamble sequence selected from among a subset of preamble sequences. In such aspects, the subset of preamble sequences may correspond to an index of the selected sub-beam associated with the SSB.

In some aspects, sending to the base station an indication of the selected sub-beam associated with the SSB in a PRACH message may include determining a mapping of sub-beams associated with the SSB and preamble sequences, and selecting a preamble sequence from among the preamble sequences corresponding to the selected sub-beam based on the determined mapping. In such aspects, sending to the base station an indication of the selected sub-beam associated with the SSB in a Physical Random Access Channel (PRACH) message may include sending the selected preamble sequence in the PRACH message. Some aspects may include performing an initial access procedure with the base station using the selected sub-beam associated with the SSB.

Further aspects include a wireless device having a processor configured to perform one or more operations of any of the methods summarized above. Further aspects include processing devices for use in a wireless device configured with processor-executable instructions to perform operations of any of the methods summarized above. Further aspects include a non-transitory processor-readable storage medium having stored thereon processor-executable instructions configured to cause a processor of a wireless device to perform operations of any of the methods summarized above. Further aspects include a wireless device having means for performing functions of any of the methods summarized above. Further aspects include a system on chip for use in a wireless device and that includes a processor configured to perform one or more operations of any of the methods summarized above.

DETAILED DESCRIPTION

Figure 1:
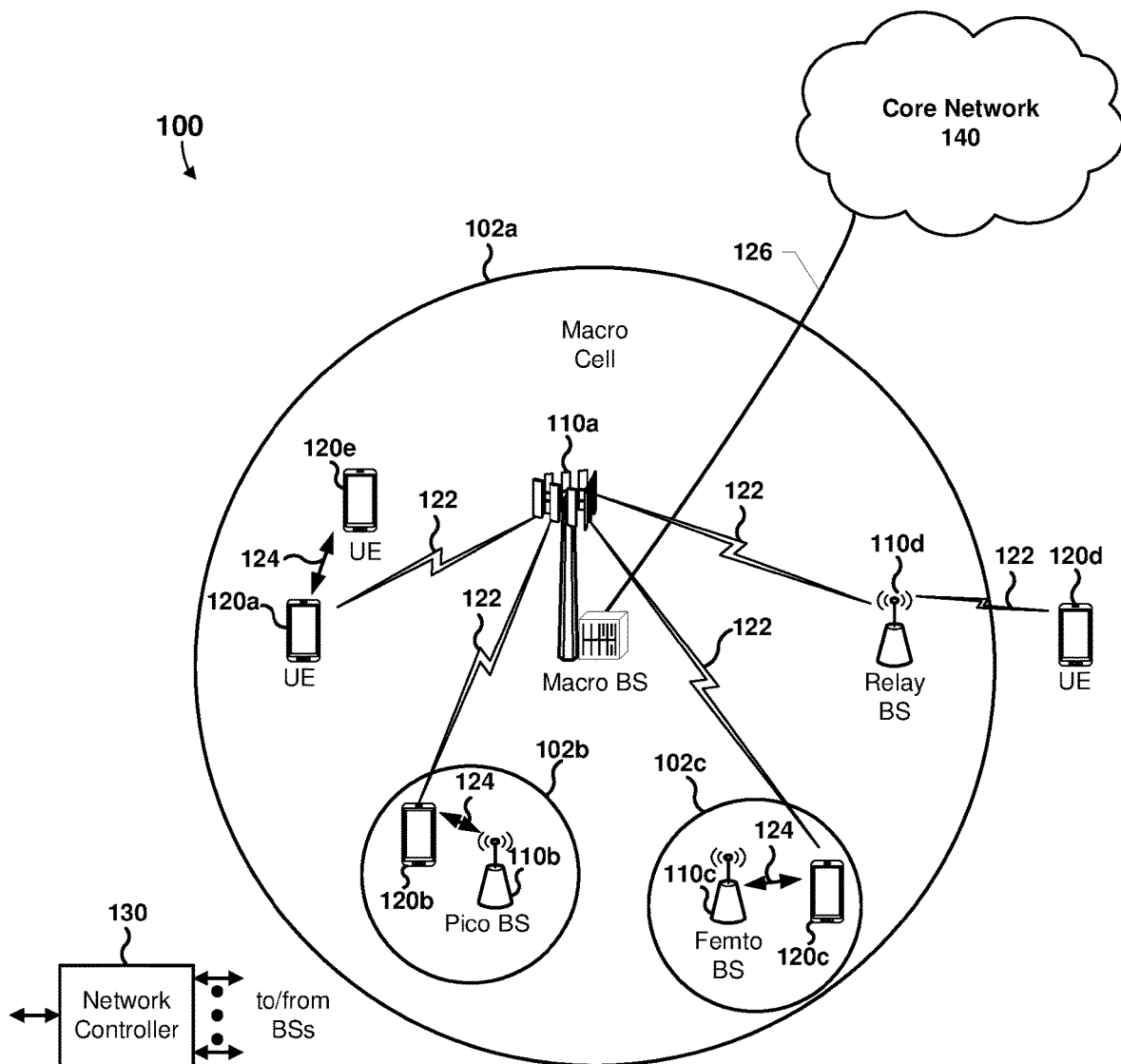
FIG. 1 is a system block diagram illustrating an example communications system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include systems and methods for managing communication between a wireless device and a base station for enhancing coverage for completing initial access processes by enabling initial access communications to be transmitted using a directional beam. In various embodiments, a base station may transmit, such as via a physical downlink control channel (PDCCH), Remaining Minimum System Information (RMSI) Downlink Control Information (DCI) including information that may enable a wireless device to determine time and frequency resources for receiving a Channel State Indicator-Reference Signal (CSI-RS). For example, in some embodiments, the RMSI-DCI may include information that enables the wireless device to determine time and frequency resources for receiving the CSI-RS. As another example, the timing and resources for receiving the CSI-RS may be defined predefined and known to the wireless device. The base station may then transmit the CSI-RS according to the timing using the frequency resources. In some embodiments, the base station may transmit the CSI-RS in association with an RMSI transmission, such as just before, along with, or just after the RMSI. In some embodiments the RMSI may indicate the time and frequency resources for receiving the CSI-RS. A wireless device may receive a Channel State Indicator-Reference Signal (CSI-RS) based on the time and frequency resources and may select a sub-beam of a beam associated with a synchronization signal block (SSB) based on the CSI-RS. In some embodiments, the wireless device may select a sub-beam based on a Reference Signal Received Power (RSRP) measurement on the associated CSI-RS resources, such as selecting the sub-beam with the highest received power on its associated CSI-RS resources. The criteria for selecting a sub-beam may be specified in a standard specification or based on wireless device implementation. The wireless device may send to the base station an indication of the selected sub-beam associated with the SSB in a Physical Random Access Channel (PRACH) message. The base station may then communicate the initial access procedure messages with the wireless device using the selected sub-beam indicated by the wireless device. Thus, various embodiments enable the initial access communications with the enhanced gain achieved through the use of the selected sub-beam for establishing a communication link between the base station and the wireless device.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palm-top computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixedsignal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

As used herein, "beam" refers to a signal formed at a transmitting device through the use of a beamforming or beam steering technique applied via a combination of physical equipment and signal processing variously referred to as a beamforming function, a mapping function, or a spatial filter. Beam reception by a receiving device may involve configuring physical equipment and signal processing of the receiving device to receive signals transmitted in a beam by the transmitting device. In some situations, beam reception by a receiving device also may involve configuring physical equipment and signal processing of the receiving device via a beamforming function, a mapping function, or a spatial filter so as to preferentially receive signals (e.g., with enhanced gain) from a particular direction (e.g., in a direction aligned with a transmitting device).

The term "beamforming" is used herein to refer to antenna array design and signal processing techniques used for directional signal communications and/or to achieve spatial selectivity of radio frequency (RF) signal reception. Beamforming on the transmitter end of communications may be accomplished by selective delaying (known as "phase shifting") of signals coupled to different elements in an antenna array so that RF signals emitted by the antenna array at a particular angle (relative to the antenna array) are enhanced through constructive interference while RF signals emitted by the antenna array at other angles (relative to the antenna) exhibit lower signal strength due to destructive interference. Beamforming on the receiver end of communications may be accomplished by processing signals received by elements in an antenna array through phase shifting circuits so that RF signals received at particular angles relative to the receiving antenna array are enhanced through constructive interference while RF signals received at other angles relative to the wireless device are reduced in perceived signal strength through destructive interference. Using beamforming techniques, RF signals may be transmitted (e.g., by a base station or wireless device) in one or more directional "beams" within the millimeter band for ultra-wideband communications. Each of such directional beams may be controlled by the transmitter using beamforming techniques to sweep in one or two dimensions (i.e., azimuth and elevation directions). Beamforming in both transmitters and receivers may be accomplished using analog (e.g., phase shifter) circuits and digital processing techniques. To encompass both techniques, reference is sometimes made herein to "analog/RF beamforming" techniques and equipment.

As used herein, "sub-beam" refers to a portion of a beam or a refinement of a beam, in which the sub-beam has a beamwidth that is a subset of (i.e., smaller than and within) a beamwidth of a beam and/or an aperture of one or more antenna elements forming the beam.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), Institute of Electrical and Electronics Engineers (IEEE) 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

In Long Term Evolution (LTE) Fifth Generation (5G) New Radio (NR) and other communication technologies, wireless devices perform an initial access procedure to establish communication with a communication network (e.g., via a base station or other suitable access point). Some communication systems utilize millimeter wave (mmWave) frequency bands to provide high bandwidth communication links. However, mmWave frequency bands are susceptible to free-space pathloss and atmospheric absorption. Further, broadcast transmissions from a base station are more severely affected by such signal degradation. One example of such broadcast transmissions includes system information transmitted by a base station for use by a wireless device to perform initial access procedures. Further, initial access messages including random access channel (RACH) messages such as a physical random access channel (PRACH) message, a Msg2 RACH response on the physical downlink control channel (PDCCH), and a Msg3 RACH message on the physical uplink shared channel (PUSCH), each may experience coverage problems in mmWave frequency ranges (such as Frequency Range 2 (FR2)), including lower receive power at a wireless device, and greater susceptibility to path loss.

Various embodiments include methods and wireless devices and base stations configured to perform the methods of coverage enhancement for initial access. In various embodiments, a base station may transmit an RMSI-DCI message to a wireless device, such as via a PDCCH. In some embodiments, the RMSI DCI may indicate a number of sub-beams of the SSB, such as in a bit field of the RMSI DCI. In some embodiments, the RMSI DCI may include time and frequency resources for an RMSI as well as a CSI-RS. The base station may transmit the RMSI according to the time and frequency resources. The RMSI may include system information block (SIB) information, such as a SIB Type 1 (SIB1). The base station may also transmit the CSI-RS. Transmitting the CSI-RS in association with the RMSI, such as before, during or just after the RMSI, enables the wireless device to perform measurements on the signal over various sub-beams before the base station and wireless device have completed initial access procedures.

The wireless device may receive the RMSI DCI, and may determine time and frequency resources for receiving the CSI-RS based on the RMSI DCI. In some embodiments, the wireless device may determine time and frequency resources for the CSI-RS based on the time and frequency resources for the RMSI. In some embodiments, the wireless device may also determine an additional parameter in the RSMI DCI. In some embodiments, the wireless device may determine time and frequency resources for the CSI-RS based on the time and frequency resources for the RMSI and the additional parameter.

The wireless device may receive the CSI-RS using the determined time and frequency resources, and determine based on the CSI-RS a selected sub-beam associated with a synchronization signal block (SSB). The wireless device may then send to the base station an indication of the selected sub-beam associated with the SSB in a Physical Random Access Channel (PRACH) message. Thus, the wireless device provides information on the selected sub-beam for communications between the base station and the wireless device before start of the initial access procedure communications.

In some embodiments, the wireless device includes a preamble sequence in the PRACH message that corresponds to an index of the selected sub-beam associated with the SSB. In some embodiments, the wireless device may select the preamble sequence from among a subset of preamble sequences, in which the subset of preamble sequences corresponds to an index of the selected sub-beam associated with the SSB. In some embodiments, the wireless device may determine a mapping of sub-beams associated with the SSB and preamble sequences, and may select a preamble sequence from among the preamble sequences corresponding to the selected sub-beam based on the determined mapping. The wireless device may send to the base station the selected preamble sequence in the PRACH message. In some embodiments, the base station may determine the mapping of sub-beams associated with the SSB and preamble sequences (e.g., before or after receiving the PRACH message from the wireless device). The base station may identify the selected sub-beam indicated by a preamble sequence in the PRACH message according to the mapping.

The base station and the wireless device may then perform the initial access procedure using the selected sub-beam associated with the SSB. In this manner, the enhanced gain afforded through the use of beam formed transmissions and reception may enable the initial access procedure to be completed and a communication link established between the base station and the wireless device in conditions that might cause the initial access process to fail using conventional (i.e., non-beamed) procedures.

FIG. 1 is a system block diagram illustrating an example communications system 100. The communications system 100 may be a 5G New Radio (NR) network, or any other suitable network such as a Long Term Evolution (LTE) network. While FIG. 1 illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of wireless devices (illustrated as wireless devices 120a-120e in FIG. 1). The communications system 100 also may include a number of base stations (illustrated as the BS 110a, the BS 110b, the BS 110c, and the BS 110d) and other network entities. A base station is an entity that communicates with wireless devices, and also may be referred to as a Node B, an LTE Evolved nodeB (eNodeB or eNB), an access point (AP), a Radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used. The core network 140 may be any type core network, such as an LTE core network (e.g., an EPC network), 5G core network, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by wireless devices with service subscription. A pico cell may cover a relatively small geographic area and may allow unrestricted access by wireless devices with service subscription. A femto cell may cover a relatively small geographic area (for example, a home) and may allow restricted access by wireless devices having association with the femto cell (for example, wireless devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay BS 110d). A relay station is an entity that can receive a transmission of data from an upstream station (for example, a base station or a wireless device) and send a transmission of the data to a downstream station (for example, a wireless device or a base station). A relay station also may be a wireless device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, user equipment (UE), etc.

A macro base station 110a may communicate with the communication network 140 over a wired or wireless communication link 126. The wireless devices 120a, 120b, 120c may communicate with a base station 110a-110d over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 subcarriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per wireless device. Multi-layer transmissions with up to 2 streams per wireless device may be supported.

Aggregation of multiple cells may be supported with up to eight serving cells. Alternatively, NR may support a different air interface, other than an OFDM-based air interface.

Some wireless devices may be considered machine-type communication (MTC) or evolved or enhanced machine-type communication (eMTC) wireless devices. MTC and eMTC wireless devices include, for example, robots, drones, remote devices, sensors, meters, monitors, location tags, etc., that may communicate with a base station, another device (for example, remote device), or some other entity. A wireless computing platform may provide, for example, connectivity for or to a network (for example, a wide area network such as Internet or a cellular network) via a wired or wireless communication link. Some wireless devices may be considered Internet-of-Things (IoT) devices or may be implemented as NB-IoT (narrowband internet of things) devices. The wireless device 120a-120e may be included inside a housing that houses components of the wireless device 120a-120e, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

In some implementations, two or more wireless devices (for example, illustrated as the wireless device 120a and the wireless device 120e) may communicate directly using one or more sidelink channels (for example, without using a base station 110a-d as an intermediary to communicate with one another). For example, the wireless devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-120e may perform scheduling operations, resource selection operations, as well as other operations described elsewhere herein as being performed by the base station 110a-110d.

Figure 2:
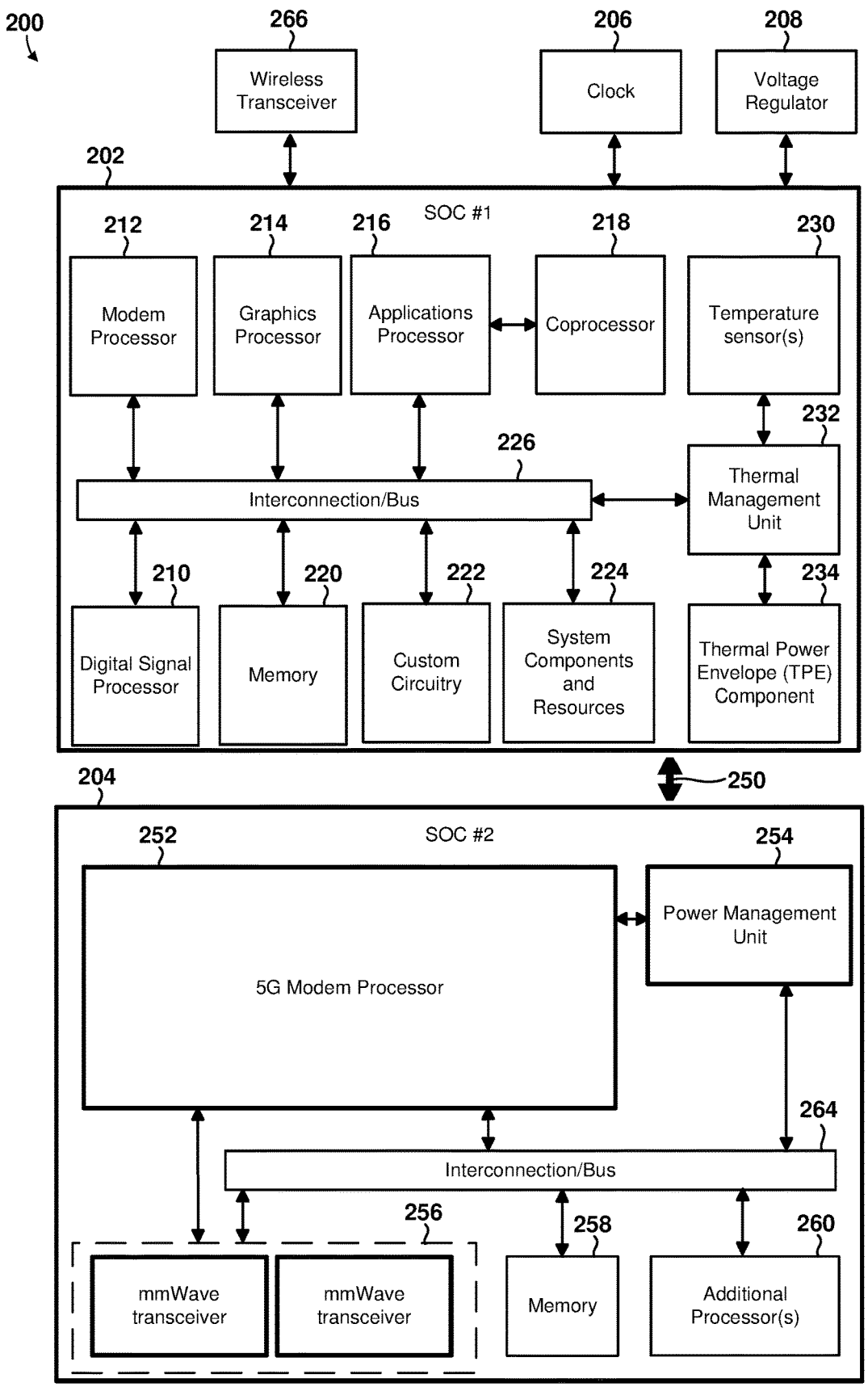
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example computing system 200 (which may be a SIP in some embodiments) includes a two SOCs 202, 204 coupled to a clock 206, a voltage regulator 208, and a wireless transceiver 266 configured to send and receive wireless communications via an antenna (not shown) to/from wireless devices, such as a base station 110a. In some implementations, the first SOC 202 may operate as central processing unit (CPU) of the wireless device that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), or very high frequency short wave length (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combination thereof.

Figure 3:
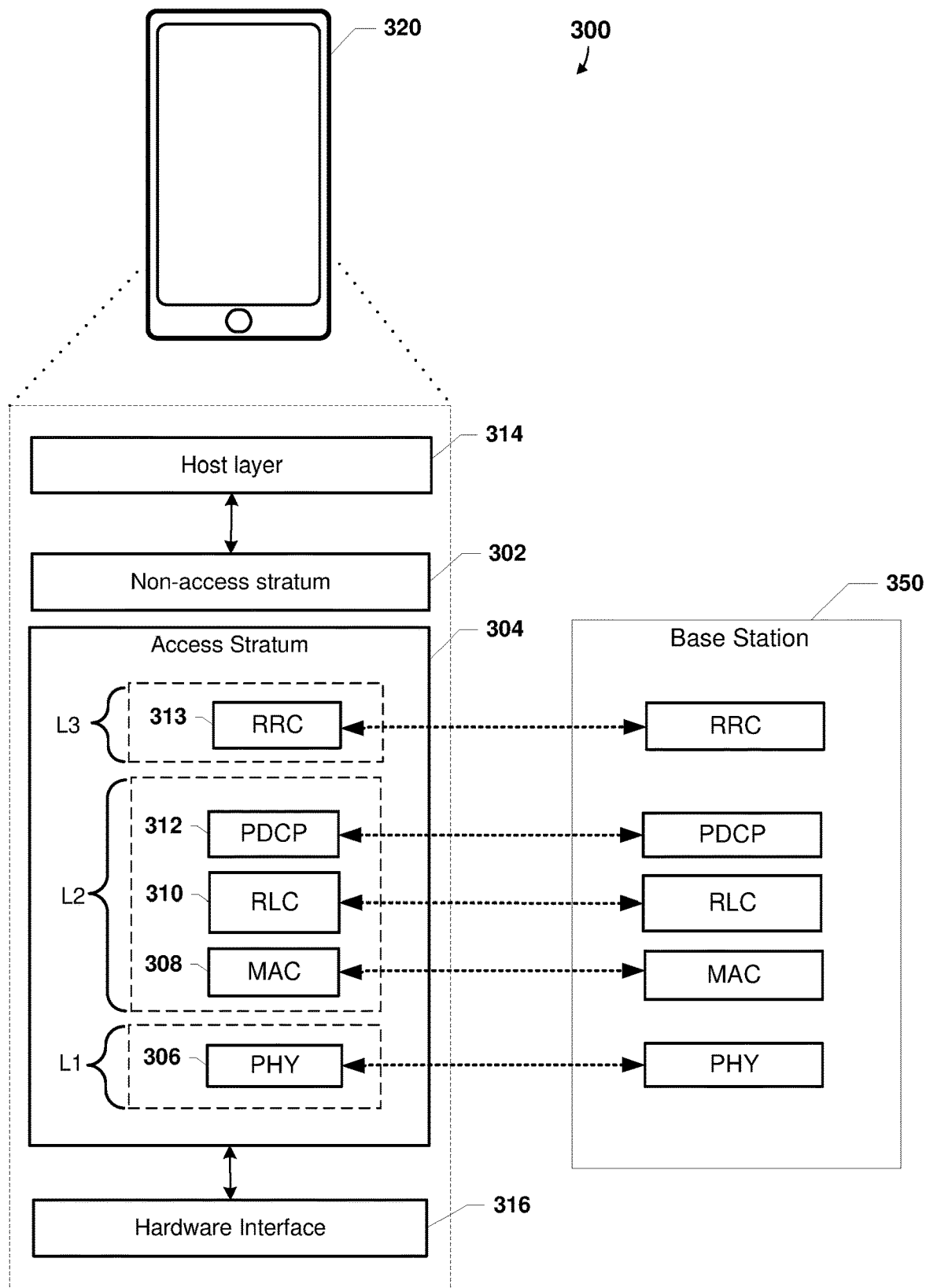
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 320 may implement the software architecture 300 to facilitate communication between a wireless device 320 (e.g., the wireless device 120a-120e, 200) and the base station 350 (e.g., the base stations 110a-110d) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (such as SIM(s) 204) and its core network 140. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface via a wireless transceiver (e.g., 266). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In some implementations, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In some implementations, the RRC sublayer 313 may provide functions including broadcasting system information, paging, and establishing and releasing an RRC signaling connection between the wireless device 320 and the base station 350.

In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some implementations, application-specific functions provided by the at least one host layer 314 may provide an interface between the software architecture and the general purpose processor 206.

In other implementations, the software architecture 300 may include one or more higher logical layer (such as transport, session, presentation, application, etc.) that provide host layer functions. For example, in some implementations, the software architecture 300 may include a network layer (such as Internet protocol (IP) layer) in which a logical connection terminates at a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency (RF) transceivers).

Figure 4A:
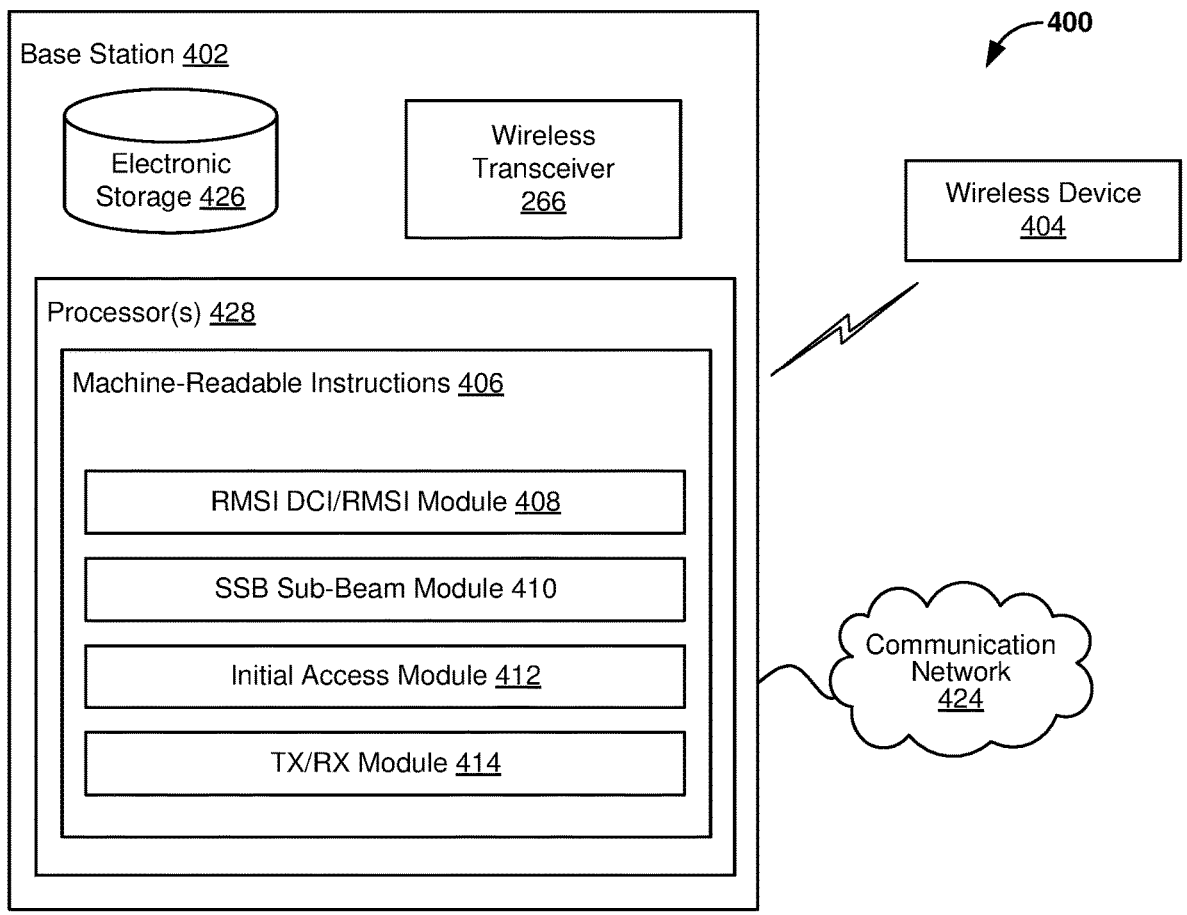
FIG. 4A is a component block diagram illustrating components and processing modules of a base station suitable for use with various embodiments.
Figure 4B:
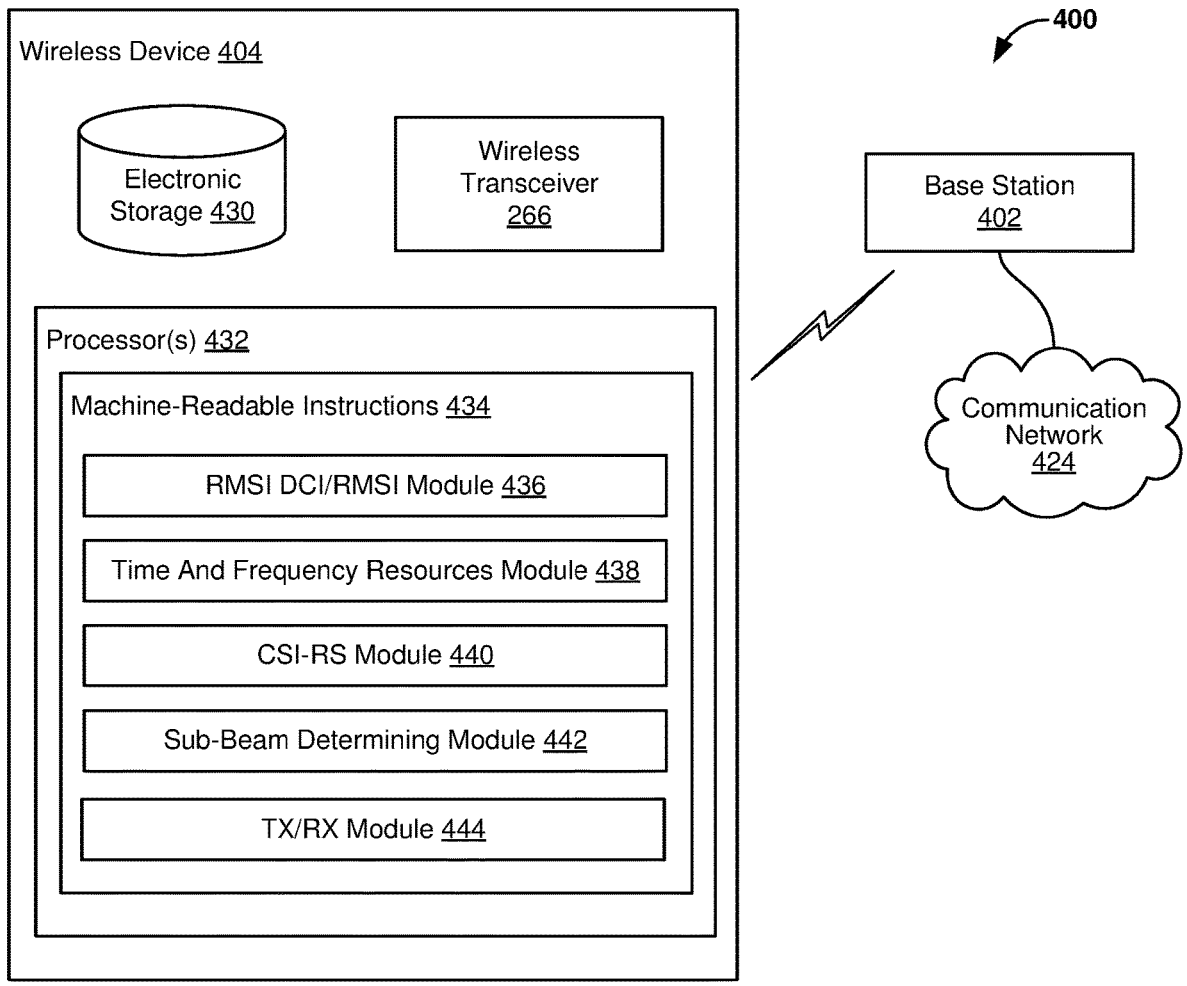
FIG. 4B is a component block diagram illustrating components and processing modules of a wireless device suitable for use with various embodiments.

FIGS. 4A and 4B are component block diagrams illustrating a system 400 configured for coverage enhancement for initial access accordance with various embodiments. With reference to FIGS. 1-4B, system 400 may include a base station 402 and a wireless device 404 (e.g., 110a-110d, 120a-120e, 200, 320, 350). The base station 402 and the wireless device 404 exchange wireless communications in order to establish a wireless communication link 122, 124, 126.

The base station 402 and the wireless device 404 may include one or more processors 428, 432 coupled to electronic storage 426, 430 and a wireless transceiver (e.g., 266). In the base station 402 and the wireless device 404, the wireless transceiver 266 may be configured to receive messages sent in transmissions and pass such message to the processor(s) 428, 432 for processing. Similarly, the processor 428, 432 may be configured to send messages for transmission to the wireless transceiver 266 for transmission.

Referring to the base station 402, the processor(s) 428 may be configured by machine-readable instructions 406. Machine-readable instructions 406 may include one or more instruction modules. The instruction modules may include computer program modules. The instruction modules may include one or more of an RMSI DCI/RMSI module 408, an SSB sub-beam module 410, an initial access module 412, a transmit/receive (TX/RX) module 414, or other instruction modules.

The RMSI DCI/RMSI module 408 may be configured to transmit (e.g., via the wireless transceiver 266) an RMSI DCI indicating that a CSI-RS will be transmitted.

The SSB sub-beam module 410 may be configured to receive from a wireless device (e.g., 404) an indication of a selected sub-beam associated with an SSB in a PRACH message.

The initial access module 412 may be configured to perform an initial access procedure with the wireless device using the selected sub-beam indicated in the PRACH message.

The transmit/receive (TX/RX) module 414 may be configured to control the transmission and reception of wireless communications with the wireless device 402, e.g., via the wireless transceiver 266.

Referring to the computing device 404, the processor(s) 432 may be configured by machine-readable instructions 434. Machine-readable instructions 406 may include one or more instruction modules. The instruction modules may include computer program modules. The instruction modules may include one or more of an RMSI DCI/RMSI module 436, a time and frequency resources module 438, a CSI-RS module 440, a sub-beam determining module 442, a TX/RX module 444, or other instruction modules.

The RMSI DCI/RMSI module 436 may be configured to receive from a base station Remaining Minimum System Information (RMSI) Downlink Control Information (DCI The time and frequency resources module 438 may be configured to determine time and frequency resources for the CSI-RS based on the RMSI DCI.

The CSI-RS module 440 may be configured to receive the CSI-RS using the determined time and frequency resources.

The sub-beam determining module 442 may be configured to determine based on the CSI-RS a selected sub-beam associated with an SSB.

The TX/RX module 444 may be configured to enable communications with the base station 402, e.g., via the wireless transceiver 266.

In some embodiments, the base station 402 and the wireless device 404 may be operatively linked via one or more electronic communication links (e.g., wireless communication link 122, 124, 126). It will be appreciated that this is not intended to be limiting, and that the scope of this disclosure includes embodiments in which the base station 402 and the wireless device 404 may be operatively linked via some other communication medium.

The electronic storage 426, 430 may include non-transitory storage media that electronically stores information. The electronic storage media of electronic storage 426, 430 may include one or both of system storage that is provided integrally (i.e., substantially non-removable) with the base station 402 and the wireless device 404 and/or removable storage that is removably connectable to the base station 402 and the wireless device 404 via, for example, a port (e.g., a universal serial bus (USB) port, a firewire port, etc.) or a drive (e.g., a disk drive, etc.). Electronic storage 426, 430 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426, 430 may include one or more virtual storage resources (e.g., cloud storage, a virtual private network, and/or other virtual storage resources). Electronic storage 426, 430 may store software algorithms, information determined by processor(s) 428, 432, information received from the base station 402 and the wireless device 404, or other information that enables the base station 402 and the wireless device 404 to function as described herein.

Processor(s) 428, 432 may be configured to provide information processing capabilities in the base station 402 and the wireless device 404. As such, the processor(s) 428, 432 may include one or more of a digital processor, an analog processor, a digital circuit designed to process information, an analog circuit designed to process information, a state machine, and/or other mechanisms for electronically processing information. Although the processor(s) 428, 432 are illustrated as single entities, this is for illustrative purposes only. In some embodiments, the processor(s) 428, 432 may include a plurality of processing units and/or processor cores. The processing units may be physically located within the same device, or processor(s) 428, 432 may represent processing functionality of a plurality of devices operating in coordination. The processor(s) 428, 432 may be configured to execute modules 408-414 and modules 436-442 and/or other modules by software; hardware; firmware; some combination of software, hardware, and/or firmware; and/or other mechanisms for configuring processing capabilities on processor(s) 428, 432. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 408-414 and modules 436-444 described below is for illustrative purposes, and is not intended to be limiting, as any of modules 408-414 and modules 436-444 may provide more or less functionality than is described. For example, one or more of the modules 408-414 and modules 436-444 may be eliminated, and some or all of its functionality may be provided by other modules 408-414 and modules 436-444. As another example, the processor(s) 428, 432 may be configured to execute one or more additional modules that may perform some or all of the functionality attributed below to one of the modules 408-414 and modules 436-444.

Figure 5A:
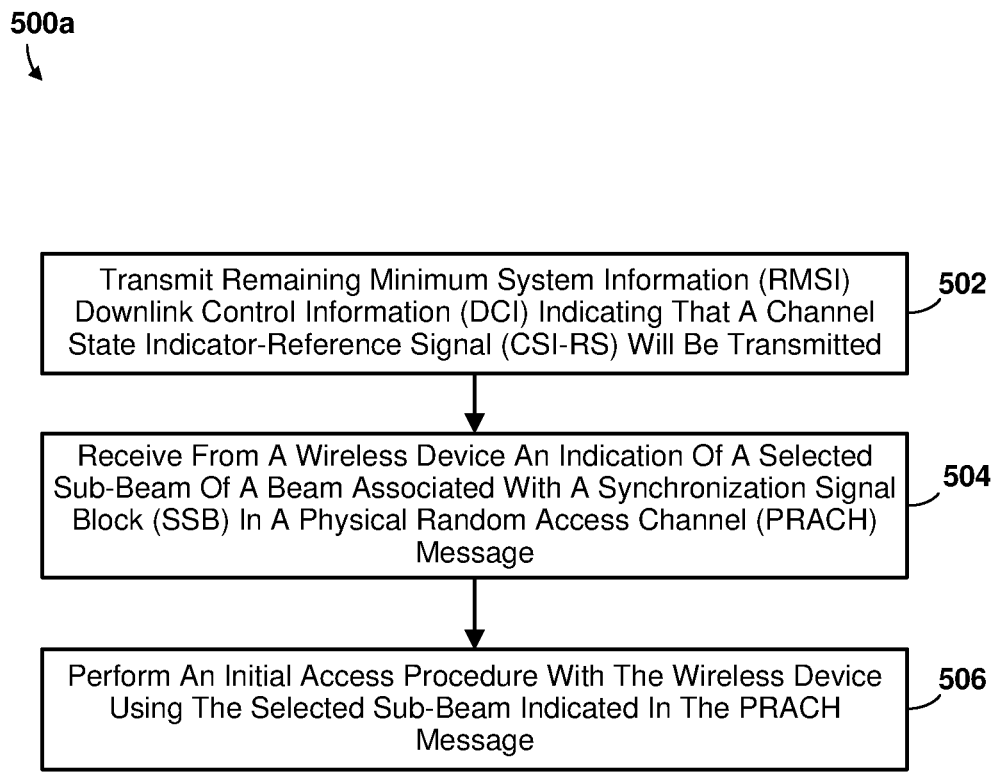
FIG. 5A is a process flow diagram illustrating a method performed by a processor of a base station for enhancing coverage for initial access.
Figure 5B:
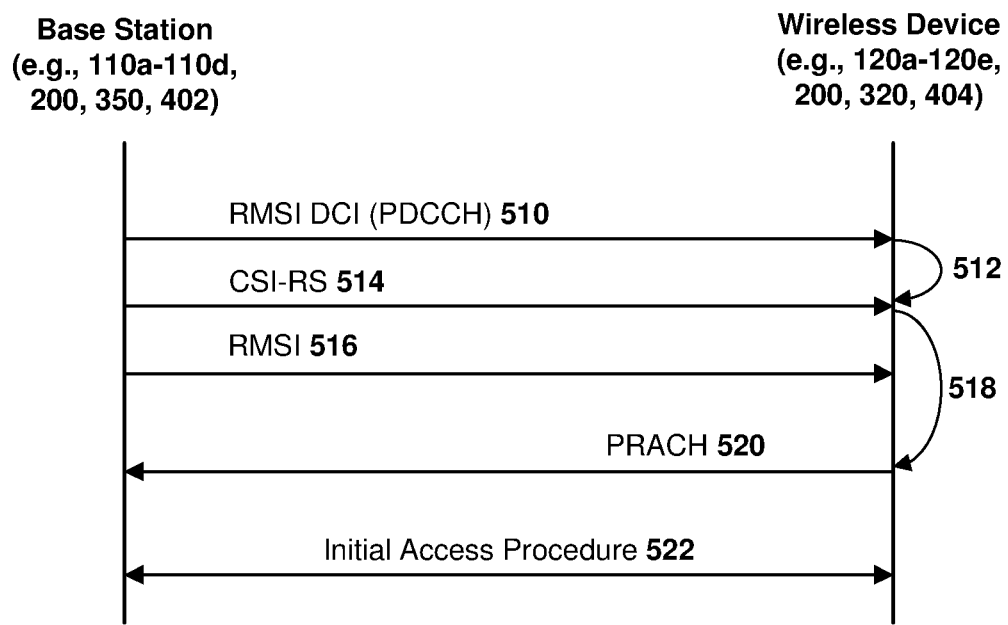
FIG. 5B is a message flow diagram illustrating the method for enhancing coverage for initial access.

FIG. 5A is a process flow diagram illustrating a method 500a performed by a processor of a base station device for coverage enhancement for initial access according to various embodiments. FIG. 5B is a message flow diagram illustrating communications exchanged between the base station and a wireless device during the method 500a. With reference to FIGS. 1-5B, the operations of the method 500a may be performed by a processor (such as the processor 210, 212, 214, 216, 218, 252, 260, 428) of a base station device (such as the base station 110a-110d, 200, 350, 402).

In block 502, the processor may transmit Remaining Minimum System Information (RMSI) Downlink Control Information (DCI) indicating that a Channel State Indicator-Reference Signal (CSI-RS) will be transmitted. In some embodiments, the RMSI DCI indicates a number of sub-beams of a synchronization signal block (SSB). Means for performing functions of the operations in block 502 may include the processor (e.g., 210, 212, 214, 216, 218, 252, 260, 428) and the wireless transceiver (e.g., 266).

In block 504, the processor may receive from a wireless device an indication of a selected sub-beam of a beam associated with a synchronization signal block (SSB) in a Physical Random Access Channel (PRACH) message. In some embodiments, the PRACH message may include a preamble sequence that indicates the selected sub-beam associated with the SSB. In some embodiments, the PRACH message may include a preamble sequence that corresponds to an index of the selected sub-beam associated with the SSB. In some embodiments, the PRACH message may include a preamble sequence from among a subset of preamble sequences, in which the subset of preamble sequences corresponds to an index of the selected sub-beam associated with the SSB. Means for performing functions of the operations in block 504 may include the processor (e.g., 210, 212, 214, 216, 218, 252, 260, 428) and the wireless transceiver (e.g., 266).

In block 506, the processor may perform an initial access procedure with the wireless device using the selected sub-beam indicated in the PRACH message. Means for performing functions of the operations in block 506 may include the processor (e.g., 210, 212, 214, 216, 218, 252, 260, 428) and the wireless transceiver (e.g., 266).

Referring to FIG. 5B, in some embodiments, the base station may transmit a RMSI DCI 510 via PDCCH. In some embodiments, the RMSI DCI may include time and frequency resources for an RMSI. In some embodiments, the time and frequency resources for the RMSI indicate time and frequency resources for the CSI-RS. In some embodiments, the time and frequency resources for the CSI-RS may be determined based on a rule-based relationship between the time and frequency resources for the RMSI and the time and frequency resources for the CSI-RS. In some embodiments, the RMSI DCI may include an additional parameter, and the time and frequency resources for the CSI-RS may be determined based on the time and frequency resources for the RMSI and the additional parameter. In some embodiments, the additional parameter may include an indication of the presence of the CSI-RS, e.g., in a bitfield of the RMSI DCI. For example, a two-bit bitfield may map to a table that may be stored in memory, which indicates a corresponding rule-based relationship for determining resources of the CSI-RS.

The wireless device may receive the RMSI DCI 510 and determine 512 the time and frequency resources for the CSI-RS 514. In some embodiments, the timing and frequency resources may be predefined (e.g., in standards or by a network operator) and stored in memory or firmware of the wireless device. In some embodiments, the RMSI DCI 510 may include some information that enables the wireless device to determine 512 the time and frequency resources for receiving the CSI-RS 514. In some embodiments the wireless device may determine 512 the time and frequency resources for receiving the CSI-RS 514 based on the time and frequency resources for the RMSI. In some embodiments, the CSI-RS 514 may be transmitted after the RMSI 516, and the wireless device my determine 512 the time and frequency resources for receiving the CSI-RS 514 based on information included in the RMSI 516.

The base station may transmit a CSI-RS 514 according to the time and frequency resources for the CSI-RS. In some embodiments, the base station may transmit the RMSI 516 in accordance with the time and frequency resources for the RMSI. In various embodiments, the base station may transmit the RMSI 516 before the CSI-RS 514, after the CSI-RS 514 (as illustrated), or at substantially the same time as the CSI-RS 514.

The wireless device may receive the CSI-RS 512 and determine 518 based on the CSI-RS the selected sub-beam associated with a synchronization signal block (SSB) for receiving signals from the base station. The wireless device may then send to the base station an indication of the selected sub-beam associated with the SSB in a PRACH 520 message.

The base station and the wireless device may then perform an initial access procedure 522 using the selected sub-beam associated with the SSB determined by the wireless device.

Figure 5C:
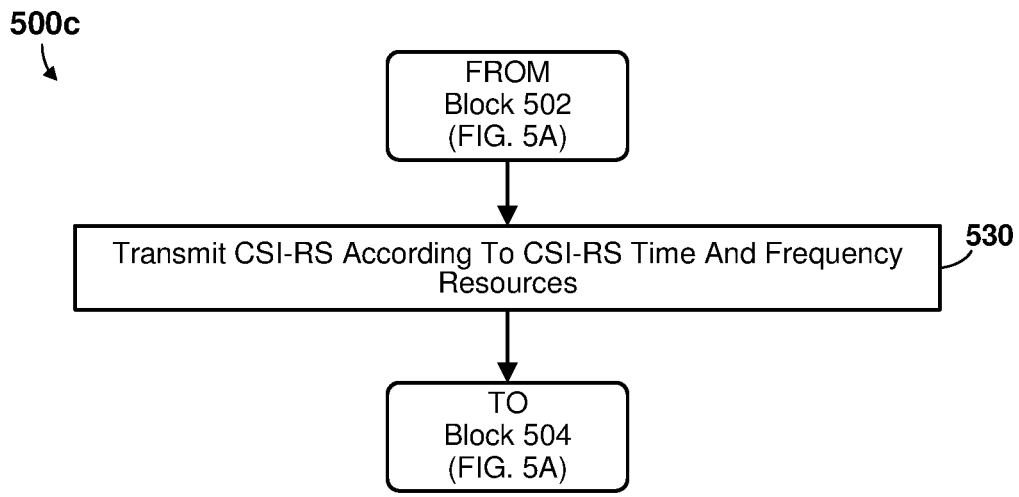
FIGS. 5C and 5D illustrate operations that may be performed as part of the method for enhancing coverage for initial access.
Figure 5D:
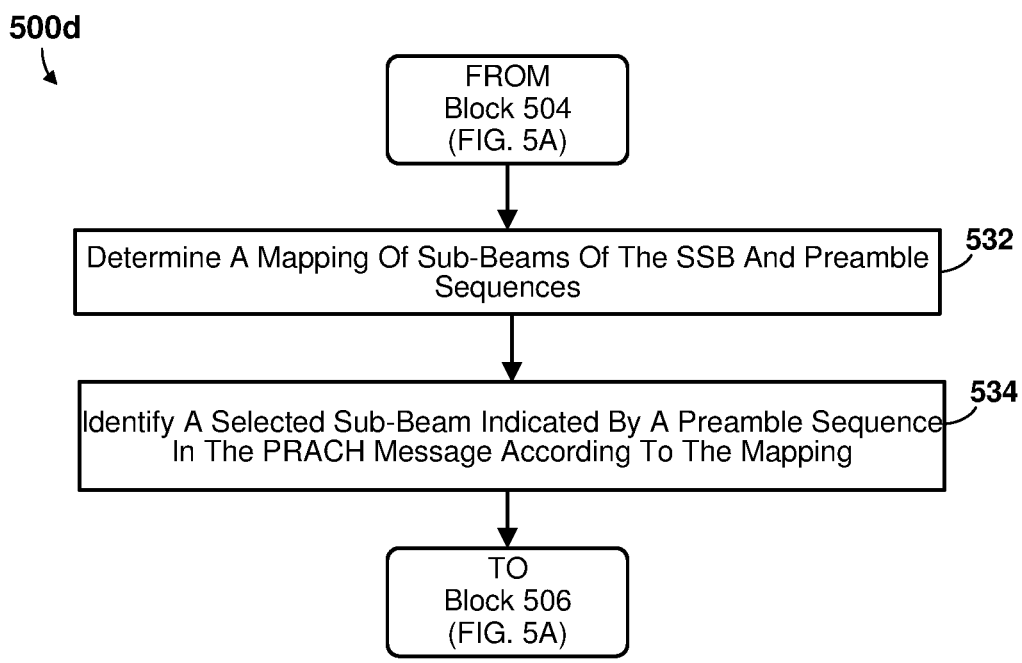

FIGS. 5C and 5D illustrate operations 500c and 500d that may be performed as part of the method 500a for coverage enhancement for initial access in accordance with some embodiments. With reference to FIGS. 1-5D, the operations 500c and 500d may be performed by a processor (such as the processor 210, 212, 214, 216, 218, 252, 260, 428) of a base station device (such as the base station 110a-110d, 200, 350, 402).

Referring to FIG. 5C, following the operations in block 502 of the method 500a (FIG. 5A), the processor may transmit the CSI-RS according to the time and frequency resources for the CSI-RS in block 530. As noted above, in some embodiments, the RMSI DCI indicates a number of sub-beams of a synchronization signal block (SSB). The CSI-RS may enable the wireless device to perform measurement to determine a selected sub-beam from among the number of sub-beams of the SSB. Means for performing functions of the operations in block 530 may include the processor (e.g., 210, 212, 214, 216, 218, 252, 260, 428) and the wireless transceiver (e.g., 266).

The processor may then perform the operations of block 504 of the method 500a (FIG. 5A) as described.

Referring to FIG. 5D, following the operations in block 504 of the method 500a (FIG. 5A), the processor may determine a mapping of sub-beams associated with the SSB and preamble sequences (e.g., PRACH preamble sequences) in block 532. In some embodiments, the mapping of the SSB sub-beams and the preamble sequences may be based on a defined rule. In some embodiments, the mapping of the SSB sub-beams and the preamble sequences may be based on the rule and/or an additional parameter in the RMSI. For example, a preamble sequence index may be represented as kn+j ($0 \leq j < k$), where k represents a number of sub-beams per SSB (e.g., k=2 or k=4, in some embodiments), j represents a sub-beam index, and n represents a function relating the SSB sub-beams and the preamble sequences. Means for performing functions of the operations in block 532 may include the processor (e.g., 210, 212, 214, 216, 218, 252, 260, 428) and the wireless transceiver (e.g., 266).

In block 534, the processor may identify the selected sub-beam indicated by a preamble sequence in the PRACH message according to the mapping. Means for performing functions of the operations in block 534 may include the processor (e.g., 210, 212, 214, 216, 218, 252, 260, 428).

The processor may then perform the operations of block 506 of the method 500a (FIG. 5A) as described.

Figure 6A:
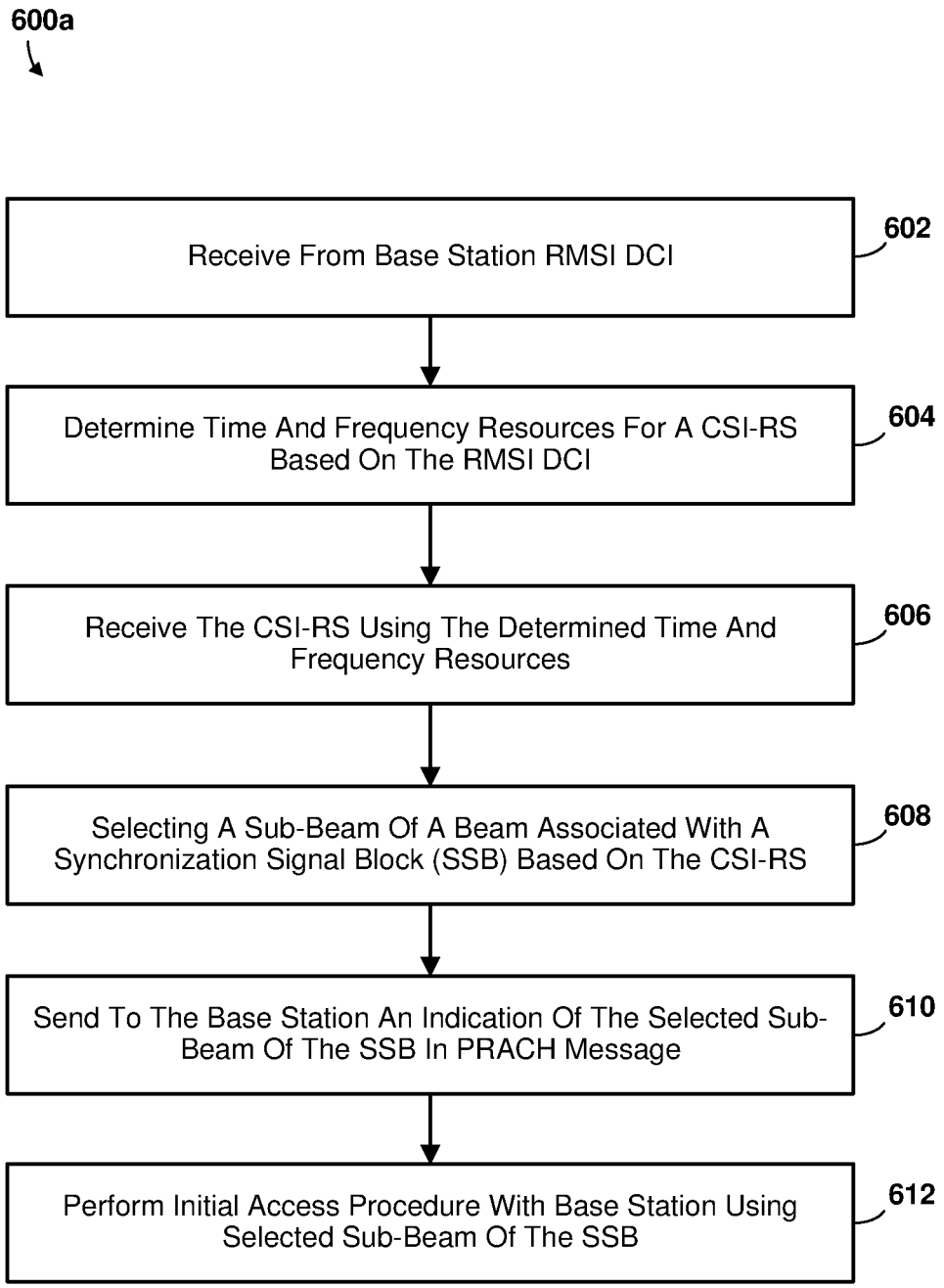
FIG. 6A is a process flow diagram illustrating a method performed by a processor of a wireless device for enhancing coverage for initial access.

FIG. 6A is a process flow diagram illustrating a method 600a performed by a processor of a wireless device for coverage enhancement for initial access according to various embodiments. With reference to FIGS. 1-6A, the operations of the method 600a may be performed by a processor (such as the processor 210, 212, 214, 216, 218, 252, 260, 432) of a base station device (such as the wireless device 120a-120f, 200, 320, 404).

In block 602, the wireless device may receive an RMSI DCI from a base station. As noted above, in some embodiments, the RMSI DCI may indicate a number of sub-beams of an SSB. Means for performing functions of the operations in block 602 may include the processor (e.g., 210, 212, 214, 216, 218, 252, 260, 432) and a wireless transceiver (e.g., 266) of the wireless device.

In block 604, the processor may determine time and frequency resources for a CSI-RS based on the RMSI DCI. In some embodiments, the processor may determine an additional parameter in the RMSI DCI, and may determine time and frequency resources for the CSI-RS based on the additional parameter. Means for performing functions of the operations in block 604 may include the processor (e.g., 210, 212, 214, 216, 218, 252, 260, 432).

In block 606, the processor may receive the CSI-RS using the determined time and frequency resources for the CSI-RS. Means for performing functions of the operations in block 606 may include the processor (e.g., 210, 212, 214, 216, 218, 252, 260, 432) and the wireless transceiver (e.g., 266).

In block 608, the processor may select a sub-beam of a beam associated with an SSB based on the CSI-RS. In some embodiments, the wireless device may select a sub-beam based on the RSRP measurement on the associated CSI-RS resources, such as selecting the sub-beam with the highest received power on its associated CSI-RS resources. The criteria for selecting a sub-beam may be specified in a standard specification or based on wireless device implementation. Means for performing functions of the operations in block 608 may include the processor (e.g., 210, 212, 214, 216, 218, 252, 260, 432).

In block 610, the processor may send to the base station an indication of the selected sub-beam associated with the SSB in a PRACH message. In some embodiments, the processor may include in the PRACH message a preamble sequence that corresponds to an index of the selected sub-beam associated with the SSB. In some embodiments, the PRACH message may include a preamble sequence selected from among a subset of preamble sequences, in which the subset of preamble sequences corresponds to an index of the selected sub-beam associated with the SSB. Means for performing functions of the operations in block 610 may include the processor (e.g., 210, 212, 214, 216, 218, 252, 260, 432) and the wireless transceiver (e.g., 266).

In block 612, the processor may perform an initial access procedure with the base station using the selected sub-beam associated with the SSB. Means for performing functions of the operations in block 612 may include the processor (e.g., 210, 212, 214, 216, 218, 252, 260, 432) and the wireless transceiver (e.g., 266).

Figure 6B:
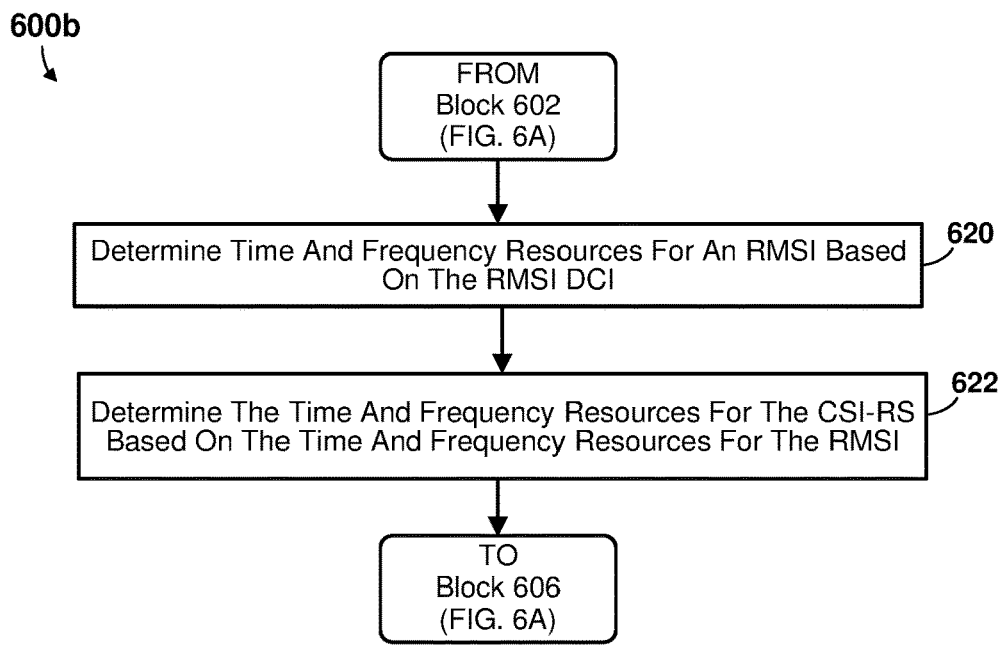
FIGS. 6B and 6C illustrate operations that may be performed as part of the method for enhancing coverage for initial access.
Figure 6C:
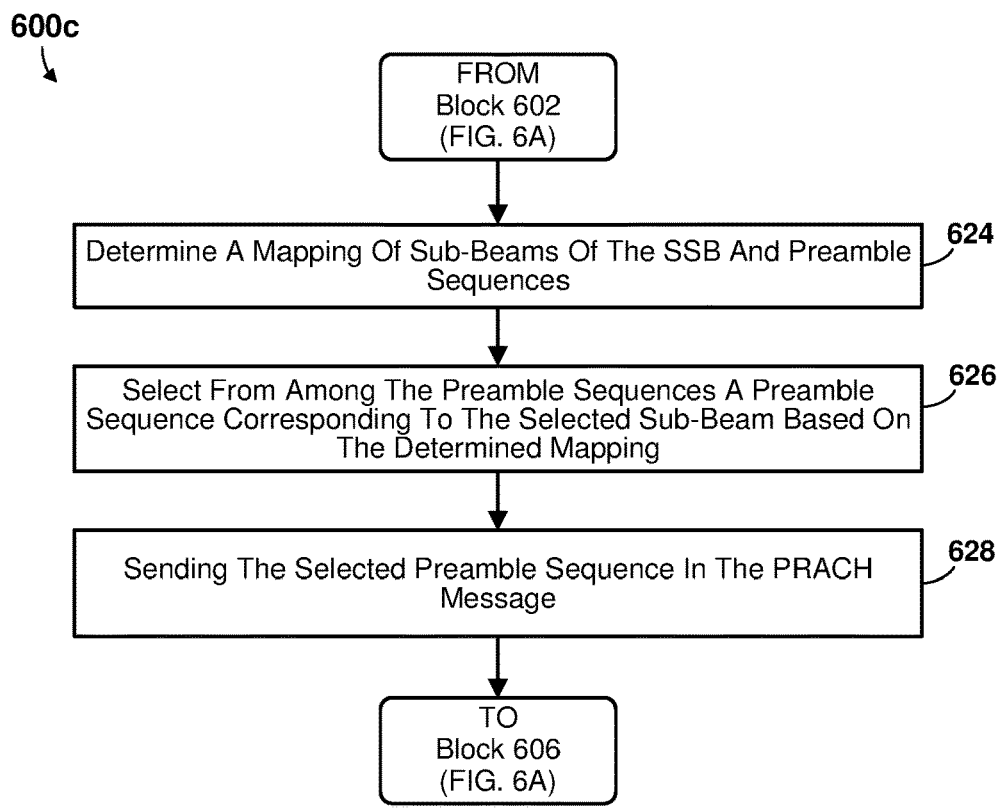

FIGS. 6B and 6C illustrate operations 600b and 600c that may be performed by a processor of wireless device as part of the method 600a for coverage enhancement for initial access. With reference to FIGS. 1-6C, the operations 600b and 600c may be performed by a processor (such as the processor 210, 212, 214, 216, 218, 252, 260, 432) of a wireless device (such as the wireless device 120a-120f, 200, 320, 404).

Referring to FIG. 6B, following the operations in block 602 of the method 600a (FIG. 6A), the processor may determine time and frequency resources for an RMSI based on the RMSI DCI in block 620. Means for performing functions of the operations in block 620 may include the processor (e.g., 210, 212, 214, 216, 218, 252, 260, 432).

In block 622, the processor may determine time and frequency resources for the CSI-RS based on the time and frequency resources for the RMSI. Means for performing functions of the operations in block 622 may include the processor (e.g., 210, 212, 214, 216, 218, 252, 260, 432).

The processor may then perform the operations of block 606 of the method 600a (FIG. 6A) as described.

Referring to FIG. 6C, following the operations in block 602 of the method 600a (FIG. 6A), the processor may determine a mapping of sub-beams associated with the SSB and preamble sequences in block 624. Means for performing functions of the operations in block 624 may include the processor (e.g., 210, 212, 214, 216, 218, 252, 260, 432).

In block 626, the processor may select a preamble sequence from among the preamble sequences corresponding to the selected sub-beam based on the determined mapping. Means for performing functions of the operations in block 626 may include the processor (e.g., 210, 212, 214, 216, 218, 252, 260, 432).

In block 628, the processor may send the selected preamble sequence in the PRACH message. Means for performing functions of the operations in block 628 may include the processor (e.g., 210, 212, 214, 216, 218, 252, 260, 432) and the wireless transceiver (e.g., 266).

The processor may then perform the operations of block 606 of the method 600a (FIG. 6A) as described.

Figure 7:
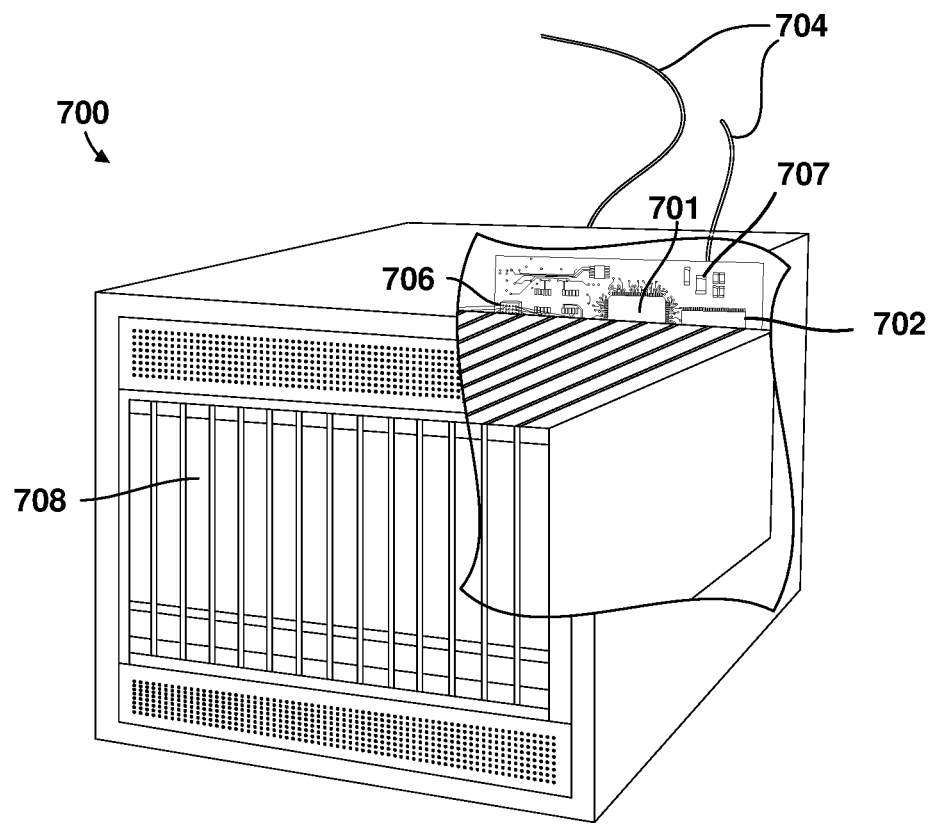
FIG. 7 is a component block diagram of a base station computing device suitable for use with various embodiments.

FIG. 7 is a component block diagram of a base station computing device suitable for use with various embodiments. Such base station computing devices (e.g., base station 110a-110d, 350, 402) may include at least the components illustrated in FIG. 7. With reference to FIGS. 1-7, the base station computing device 700 may typically include a processor 701 coupled to volatile memory 702 and a large capacity nonvolatile memory, such as a disk drive 708. The base station computing device 700 also may include a peripheral memory access device 706 such as a floppy disc drive, compact disc (CD) or digital video disc (DVD) drive coupled to the processor 701. The base station computing device 700 also may include network access ports 704 (or interfaces) coupled to the processor 701 for establishing data connections with a network, such as the Internet or a local area network coupled to other system computers and servers. The base station computing device 700 may include one or more antennas 707 for sending and receiving electromagnetic radiation that may be connected to a wireless communication link. The base station computing device 700 may include additional access ports, such as USB, Firewire, Thunderbolt, and the like for coupling to peripherals, external memory, or other devices.

Figure 8:
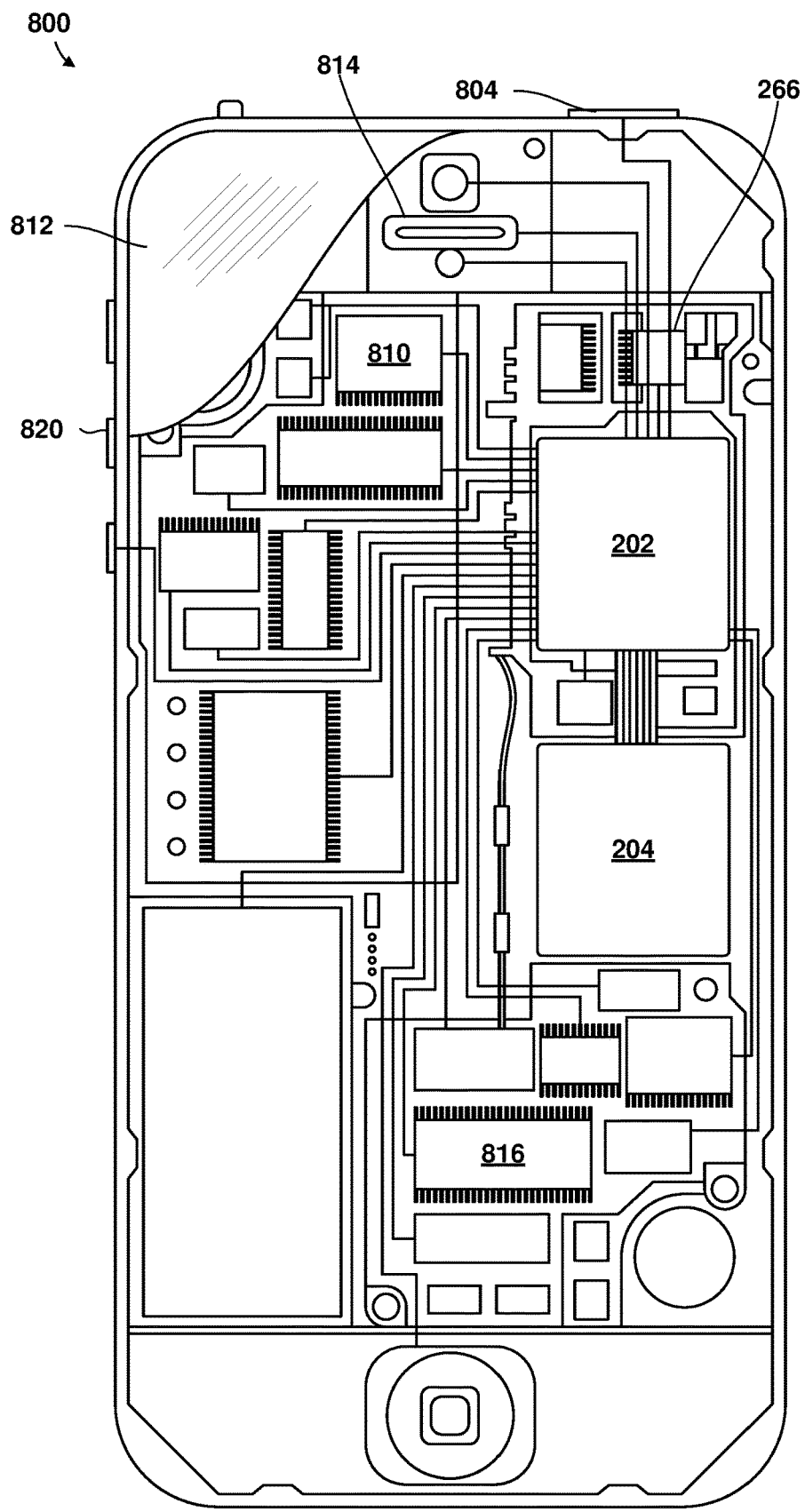
FIG. 8 is a component block diagram of a wireless device suitable for use with various embodiments.

FIG. 8 is a component block diagram of a wireless device 800 suitable for use with various embodiments. With reference to FIGS. 1-8, various embodiments may be implemented on a variety of wireless devices 800 (for example, the wireless device 120a-120e, 200, 320, 404), an example of which is illustrated in FIG. 8 in the form of a smartphone. The wireless device 800 may include a first SOC 202 (for example, a SOC-CPU) coupled to a second SOC 204 (for example, a 5G capable SOC). The first and second SOCs 202, 204 may be coupled to internal memory 816, a display 812, and to a speaker 814. Additionally, the wireless device 800 may include an antenna 804 for sending and receiving electromagnetic radiation that may be connected to a wireless transceiver 266 coupled to one or more processors in the first and/or second SOCs 202, 204. Wireless device 800 may include menu selection buttons or rocker switches 820 for receiving user inputs.

The wireless device 800 wireless device 800 may include a sound encoding/decoding (CODEC) circuit 810, which digitizes sound received from a microphone into data packets suitable for wireless transmission and decodes received sound data packets to generate analog signals that are provided to the speaker to generate sound. One or more of the processors in the first and second SOCs 202, 204, wireless transceiver 266 and CODEC 810 may include a digital signal processor (DSP) circuit (not shown separately).

The processors of the base station computing device 700 and the wireless device 800 may be any programmable microprocessor, microcomputer or multiple processor chip or chips that can be configured by software instructions (applications) to perform a variety of functions, including the functions of some implementations described below. In some wireless devices, multiple processors may be provided, such as one processor within an SOC 204 dedicated to wireless communication functions and one processor within an SOC 202 dedicated to running other applications. Software applications may be stored in the memory 702, 816 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the methods and operations 500*a*, 500*c*, 500*d*, 600*a*, 600*b*, and 600*c* may be substituted for or combined with one or more operations of the methods and operations 500*a*, 500*c*, 500*d*, 600*a*, 600*b*, and 600*c*.

Implementation examples are described in the following paragraphs. While some of the following implementation examples are described in terms of example methods, further example implementations may include: the example methods discussed in the following paragraphs implemented by a base station including a processor configured with processor-executable instructions to perform operations of the methods of the following implementation examples; the example methods discussed in the following paragraphs implemented by a base station including means for performing functions of the methods of the following implementation examples; and the example methods discussed in the following paragraphs may be implemented as a non-transitory processor-readable storage medium having stored thereon processor-executable instructions configured to cause a processor of a base station to perform the operations of the methods of the following implementation examples.

Example 1. A method performed by a processor of a base station device for enhancing coverage for initial access, including transmitting Remaining Minimum System Information (RMSI) Downlink Control Information (DCI) indicating that a Channel State Indicator-Reference Signal (CSI-RS) will be transmitted, receiving from a wireless device an indication of a selected sub-beam of a beam associated with a synchronization signal block (SSB) in a Physical Random Access Channel (PRACH) message, and performing an initial access procedure with the wireless device using the selected sub-beam indicated in the PRACH message.

Example 2. The method of example 1, in which the RMSI DCI includes time and frequency resources for an RMSI, in which the time and frequency resources for the RMSI indicate time and frequency resources for the CSI-RS, and in which the method further includes transmitting the CSI-RS according to the time and frequency resources for the CSI-RS.

Example 3. The method of either of examples 1 or 2, in which the RMSI DCI indicates a number of sub-beams of the SSB.

Example 4. The method of any of examples 1-3, in which the received PRACH message includes a preamble sequence that indicates the selected sub-beam associated with the SSB.

Example 5. The method of any of examples 1-4, in which the received PRACH message includes a preamble sequence that corresponds to an index of the selected sub-beam associated with the SSB.

Example 6. The method of any of examples 1-5, in which the received PRACH message includes a preamble sequence from among a subset of preamble sequences, in which the subset of preamble sequences corresponds to an index of the selected sub-beam associated with the SSB.

Example 7. The method of any of examples 1-6, further including determining a mapping of sub-beams associated with the SSB and preamble sequences, and identifying the selected sub-beam indicated by a preamble sequence in the PRACH message according to the mapping.

Example 8. A method performed by a processor of a wireless device for enhancing coverage for initial access, including receiving from a base station Remaining Minimum System Information (RMSI) Downlink Control Information (DCI), determining time and frequency resources for a Channel State Indicator-Reference Signal (CSI-RS) based on the RMSI DCI, receiving the CSI-RS using the determined time and frequency resources, selecting a sub-beam of a beam associated with a synchronization signal block (SSB) based on the CSI-RS, and sending to the base station an indication of the selected sub-beam associated with the SSB in a Physical Random Access Channel (PRACH) message.

Example 9. The method of example 8, in which selecting a sub-beam of a beam associated with a synchronization signal block (SSB) based on the CSI-RS includes selecting a sub-beam with highest received power on associated CSI-RS resources.

Example 10. The method of either of examples 8 or 9, in which determining time and frequency resources for the CSI-RS based on the RMSI DCI includes determining time and frequency resources for an RMSI based on the RMSI DCI, and determining time and frequency resources for the CSI-RS based on the time and frequency resources for the RMSI.

Example 11. The method of any of examples 8-10, in which determining time and frequency resources for a CSI-RS based on a signal from a base station includes determining an additional parameter in the RMSI DCI, and determining time and frequency resources for the CSI-RS based on the time and frequency resources for the RMSI includes determining time and frequency resources for the CSI-RS based on the additional parameter.

Example 12. The method of any of examples 8-11, in which the RMSI DCI indicates a number of sub-beams of the SSB.

Example 13. The method of any of examples 8-12, in which the PRACH message includes a preamble sequence that corresponds to an index of the selected sub-beam associated with the SSB.

Example 14. The method of any of examples 8-13, in which the PRACH message includes a preamble sequence selected from among a subset of preamble sequences, in which the subset of preamble sequences corresponds to an index of the selected sub-beam associated with the SSB.

Example 15. The method of any of examples 8-14, in which sending to the base station an indication of the selected sub-beam associated with the SSB in a PRACH message includes determining a mapping of sub-beams associated with the SSB and preamble sequences, and selecting a preamble sequence from among the preamble sequences corresponding to the selected sub-beam based on the determined mapping, and sending to the base station an indication of the selected sub-beam associated with the SSB in a Physical Random Access Channel (PRACH) message includes sending the selected preamble sequence in the PRACH message.

Example 16. The method of any of examples 8-15, further including performing an initial access procedure with the base station using the selected sub-beam associated with the SSB.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a base station device for enhancing coverage for initial access, comprising:
    transmitting Remaining Minimum System Information (RMSI) Downlink Control Information (DCI) indicating that a Channel State Indicator-Reference Signal (CSI-RS) will be transmitted, wherein the RMSI DCI includes time and frequency resources for an RMSI, and wherein the time and frequency resources for the RMSI indicate time and frequency resources for the CSI-RS;
    transmitting the CSI-RS according to the time and frequency resources for the CSI-RS;
    receiving from a wireless device an indication of a selected sub-beam of a beam associated with a synchronization signal block (SSB) in a Physical Random Access Channel (PRACH) message; and
    performing an initial access procedure with the wireless device using the selected sub-beam indicated in the PRACH message.

2. The method of claim 1, wherein the RMSI DCI indicates a number of sub-beams of the SSB.

3. The method of claim 1, wherein the received PRACH message includes a preamble sequence that indicates the selected sub-beam associated with the SSB.

4. The method of claim 1, wherein the received PRACH message includes a preamble sequence that corresponds to an index of the selected sub-beam associated with the SSB.

5. The method of claim 1, wherein the received PRACH message includes a preamble sequence from among a subset of preamble sequences, wherein the subset of preamble sequences corresponds to an index of the selected sub-beam associated with the SSB.

6. The method of claim 1, further comprising:
    determining a mapping of sub-beams associated with the SSB and preamble sequences; and
    identifying the selected sub-beam indicated by a preamble sequence in the PRACH message according to the mapping.

7. A base station, comprising:
    a processor configured with processor executable instructions to:
        transmit Remaining Minimum System Information (RMSI) Downlink Control Information (DCI) indicating that a Channel State Indicator-Reference Signal (CSI-RS) will be transmitted, wherein the RMSI DCI includes time and frequency resources for an RMSI, and wherein the time and frequency resources for the RMSI indicate time and frequency resources for the CSI-RS;
        transmit the CSI-RS according to the time and frequency resources for the CSI-RS;
        receive from a wireless device an indication of a selected sub-beam of a beam associated with a synchronization signal block (SSB) in a Physical Random Access Channel (PRACH) message; and
        perform an initial access procedure with the wireless device using the selected sub-beam indicated in the PRACH message.

8. The base station of claim 7, wherein the processor is further configured with processor-executable instructions such that the RMSI DCI indicates a number of sub-beams of the SSB.

9. The base station of claim 7, wherein the processor is further configured with processor-executable instructions such that the received PRACH message includes a preamble sequence that indicates the selected sub-beam associated with the SSB.

10. The base station of claim 7, wherein the processor is further configured with processor-executable instructions such that the received PRACH message includes a preamble sequence that corresponds to an index of the selected sub-beam associated with of the SSB.

11. The base station of claim 7, wherein the processor is further configured with processor-executable instructions such that the received PRACH message includes a preamble sequence from among a subset of preamble sequences, wherein the subset of preamble sequences corresponds to an index of the selected sub-beam associated with the SSB.

12. The base station of claim 7, wherein the processor is further configured with processor-executable instructions to:
    determine a mapping of sub-beams associated with the SSB and preamble sequences; and
    identify the selected sub-beam indicated by a preamble sequence in the PRACH message according to the mapping.

13. A method performed by a processor of a wireless device for enhancing coverage for initial access, comprising:
    receiving from a base station Remaining Minimum System Information (RMSI) Downlink Control Information (DCI);
    determining time and frequency resources for a Channel State Indicator-Reference Signal (CSI-RS) based on the RMSI DCI, wherein determining time and frequency resources for the CSI-RS based on the RMSI DCI comprises:
        determining time and frequency resources for an RMSI based on the RMSI DCI; and
        determining time and frequency resources for the CSI-RS based on the time and frequency resources for the RMSI;
    receiving the CSI-RS using the determined time and frequency resources;

selecting a sub-beam of a beam associated with a synchronization signal block (SSB) based on the CSI-RS; and sending to the base station an indication of the selected sub-beam associated with the SSB in a Physical Random Access Channel (PRACH) message.

14. The method of claim 13, wherein selecting a sub-beam of a beam associated with a synchronization signal block (SSB) based on the CSI-RS comprises selecting a sub-beam with highest received power on associated CSI-RS resources.

15. The method of claim 13, wherein:
determining time and frequency resources for a CSI-RS based on a signal from a base station comprises determining an additional parameter in the RMSI DCI; and
determining time and frequency resources for the CSI-RS based on the time and frequency resources for the RMSI comprises determining time and frequency resources for the CSI-RS based on the additional parameter.

16. The method of claim 13, wherein the RMSI DCI indicates a number of sub-beams associated with the SSB.

17. The method of claim 13, wherein the PRACH message includes a preamble sequence that corresponds to an index of the selected sub-beam associated with the SSB.

18. The method of claim 13, wherein the PRACH message includes a preamble sequence selected from among a subset of preamble sequences, wherein the subset of preamble sequences corresponds to an index of the selected sub-beam associated with the SSB.

19. The method of claim 13, wherein:
sending to the base station an indication of the selected sub-beam associated with the SSB in a PRACH message comprises:
determining a mapping of sub-beams associated with the SSB and preamble sequences; and
selecting a preamble sequence from among the preamble sequences corresponding to the selected sub-beam based on the determined mapping; and
sending to the base station an indication of the selected sub-beam associated with the SSB in a Physical Random Access Channel (PRACH) message comprises sending the selected preamble sequence in the PRACH message.

20. The method of claim 13, further comprising performing an initial access procedure with the base station using the selected sub-beam associated with the SSB.

21. A wireless device, comprising:
a processor configured with processor-executable instructions to:
receive from a base station Remaining Minimum System Information (RMSI) Downlink Control Information (DCI);
determine time and frequency resources for a Channel State Indicator-Reference Signal (CSI-RS) based on the RMSI DCI, wherein the processor is further configured with processor-executable instructions to:
determine time and frequency resources for an RMSI based on the RMSI DCI; and
determine time and frequency resources for the CSI-RS based on the time and frequency resources for the RMSI;
receive the CSI-RS using the determined time and frequency resources;
select a sub-beam of a beam associated with a synchronization signal block (SSB) based on the CSI-RS; and
send to the base station an indication of the selected sub-beam associated with the SSB in a Physical Random Access Channel (PRACH) message.

22. The wireless device of claim 21, wherein the processor is further configured with processor-executable instructions to select a sub-beam with highest received power on associated CSI-RS resources.

23. The wireless device of claim 21, wherein the processor is further configured with processor-executable instructions to:
determine an additional parameter in the RMSI DCI; and
determine time and frequency resources for the CSI-RS based on the additional parameter.

24. The wireless device of claim 21, wherein the processor is further configured with processor-executable instructions such that the RMSI DCI indicates a number of sub-beams of the SSB.

25. The wireless device of claim 21, wherein the processor is further configured with processor-executable instructions such that the PRACH message includes a preamble sequence that corresponds to an index of the selected sub-beam associated with the SSB.

26. The wireless device of claim 21, wherein the processor is further configured with processor-executable instructions such that the PRACH message includes a preamble sequence selected from among a subset of preamble sequences, wherein the subset of preamble sequences corresponds to an index of the selected sub-beam associated with the SSB.

* * * * *